United States Patent [19]

Pin et al.

[11] Patent Number: 4,714,976

[45] Date of Patent: Dec. 22, 1987

[54] MULTIPOLE BREAKING DEVICE WITH REMOTE CONTROL

[75] Inventors: Bernard Pin, Meylan, France; André Delbosse; Ivan Dubreucq, both of Brussels, Belgium

[73] Assignee: Merlin Gerin, France

[21] Appl. No.: 840,085

[22] Filed: Mar. 17, 1986

[30] Foreign Application Priority Data

Mar. 26, 1985 [FR] France ................................ 8504620

[51] Int. Cl.[4] ........................ H02H 1/01; H01H 47/28

[52] U.S. Cl. .................................... 361/114; 361/153; 307/142

[58] Field of Search ............... 361/114, 115, 152, 153; 307/142

[56] References Cited

U.S. PATENT DOCUMENTS 4,272,687 6/1981 Borkan ................................ 361/115

4,532,486 7/1985 Terrier .................................. 335/13

4,578,734 3/1986 Delbosse ............................. 361/152

FOREIGN PATENT DOCUMENTS 2535520 3/1985 France .

OTHER PUBLICATIONS

Tyler, "Inverters Provide ON-OFF from Momentary Switch," IN: EDN, vol. 21, No. 12, Jun. 20, 1976, p. 126.

*Primary Examiner*—L. T. Hix
*Assistant Examiner*—David Porterfield
*Attorney, Agent, or Firm*—Parkhurst & Oliff

[57] ABSTRACT

A remotely controlled circuit breaker or switch comprises two breaking poles adjoining a remote control unit with an electromagnet, and a toggle for manual operation of the contacts. The remote control unit comprises a selector switch for switching into the electronic circuit a position detector of breaker contacts, four connection terminals, and an electronic power supply circuit for an electromagnet. Two of the input terminals TL (inpulse relay mode) and CT (contactor mode in the active position of the selector switch), are accessible simultaneously with the existence of a priority code between the two controls and of a refresh function of the statuses of the electronic circuit. The latter allows forced manual operation by means of the toggle.

8 Claims, 10 Drawing Figures

66

66

Fig. 8A
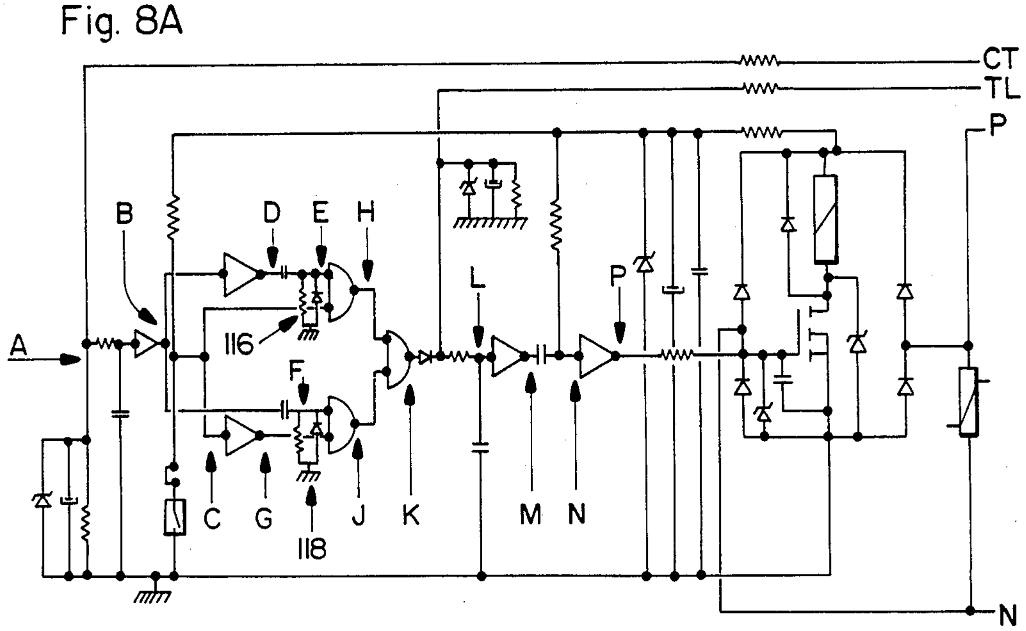
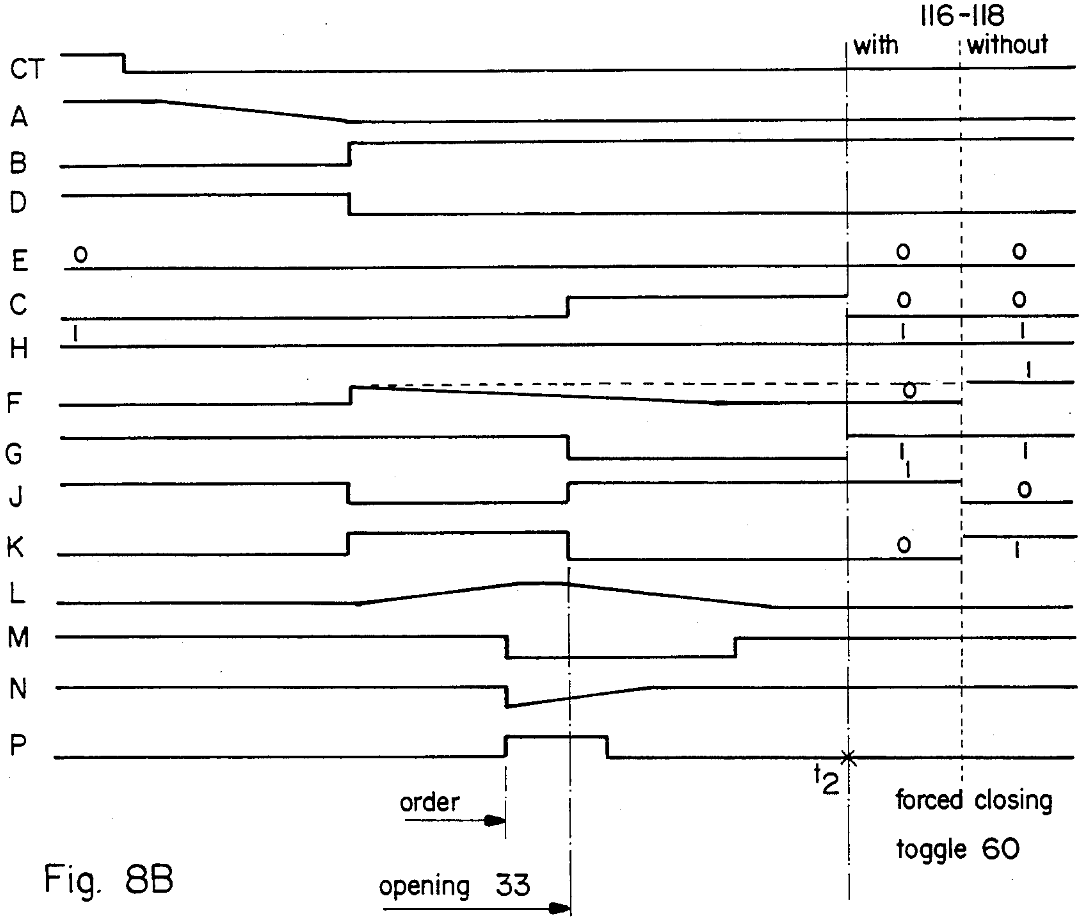
Fig. 8B

MULTIPOLE BREAKING DEVICE WITH REMOTE CONTROL

BACKGROUND OF THE INVENTION

The invention relates to a multipole breaking device with electric remote control, comprising:

- a breaking device per pole equipped with a bistable mobile main contact which can move between two closing and opening positions,
- a first automatic tripping mechanism cooperating with a trip release to move the mobile main contact to the open position in the event of a fault occurring,
- a first manual device for resetting the first tripping mechanism,
- a remote control unit comprising an electromagnetic actuator associated with a second mechanism mechanically linked with the mobile main contact of each pole,
- a second manual device coupled to the second mechanism to authorize manual opening and closing of said mobile main contact.

A device of this kind is described in French Patent application No. 2,535,520 filed by the applicant. It can be noted that the first tripping mechanism and the second remote control mechanism are independent from one another, but they both act on the same mobile main contact. The mechanical link between the second remote control mechanism and the mobile contact is arranged in such a way as not to hinder an action of the first tripping mechanism. After tripping on a fault, the first tripping mechanism must be reset by actuating the first manual device to allow a remote closing order. The second manual device coupled to the second mechanism takes the place of the remote control for manual opening or closing of the device. The remote control unit is housed in a moulded insulating case which comprises remote control wire connection terminals for actuation of the electromagnet. This remote control of the breaking device generally lends itself to an impulse relay operating mode due to a suitable control signal applied to the connection terminals.

The object of the invention is to increase the operating scope of such a device by adapting the remote control unit to different control signals allowing multiple operation.

SUMMARY OF THE INVENTION

The remote control unit according to the invention advantageously comprises:

- an electronic circuit designed to control excitation of the electromagnet in such a way as to bring about in the set position of the first mechanism a status change of the bistable mobile contact on each control pulse applied to a static switch connected in the electromagnet power supply circuit,
- a mobile main contact position detector,
- a first input terminal assigned to a first control of the electronic circuit by pulses,
- a second input terminal associated with a second mixed control of said electronic circuit, said second control being designed, according to the active or inactive status of a selector switching the position detector either into or out of the circuit, respectively for a logic control by a hold signal or for a pulse control decoupled from said first control.

The first control corresponds to an impulse relay operating mode. When the selector authorizes the status of the mobile main contact position detector to be taken into account, the second control is assimilated to a contactor operating mode. When the selector neutralizes the position detector signal, the second input terminal corresponds to a pulse input decoupled from the first control, in such a way as to authorize a pilot impulse relay type control. A control of this kind can be carried out by means of the auxiliary contact unit of the device without using additional components, notably diode systems or decoupling relays. The first input terminal TL and the second input terminal CT are distinct from one another, and are accessible simultaneously authorizing coexistence between the first pulse control and the second mixed control dependent on the setting selector status. A priority code exists between these two controls, as does a refresh function of the electronic circuit statuses in the event of a power supply break.

An electronic circuit controlling a multiple operation switchgear equipped with an electromagnet device has already been put forward in the French Patent application No. 2,536,904. The contact position detector of the device still remains in circuit, and the setting selector comprises several selection studs arranged between the output of the combinatory logic circuit and the input of the monostable element. The selection of a predetermined stud authorizes accurate operation of the switchgear device, for example in impulse relay mode, or in contactor mode, but not both at once. The association of an electronic circuit of this kind with a device of the above-mentioned type would limit its scope of application, and would in addition present the drawback of generating an electrical counter-order in case of forced operation by manual opening or closing by the second device.

Another object of the invention is to authorize forced operation by the second manual contact opening or closing device, without a counter-order being emitted by the electronic circuit.

The device according to the invention is characterized by the fact that the electronic circuit controlling the electromagnet comprises a sequential logic circuit sensitive to the status of the control signal applied to the second input terminal CT, and to the status of the detector in the active position of the selector, and that time delay or shaping means modify the internal status of the logic circuit by making the detector signal passive following a forced opening or closing operation by the second manual device.

The sequential logic circuit time delay means are formed by a derivative device designed to derive the control signal applied to the second input terminal CT.

The static switch, notably a field effect power transistor, is connected in series with the electromagnet, and is controlled by a monostable element controlled by the control pulse applied to the first input terminal TL, and by the status of the sequential logic circuit.

BRIEF DESCRIPTION OF THE DRAWINGS

Other advantages and characteristics will become more clearly apparent from the following description of an embodiment of the invention, given as examples only and represented in the accompanying drawings, in which:

FIGS. 7*a*, 7*b*, 8*a* and 8*b* show a detailed phase of a chronogram, in contactor mode, of signals at different points of the circuit in FIG. 4, respectively on a remote closing and opening order of the main contacts.

DESCRIPTION OF THE PREFERRED EMBODIMENT

Figure 1:
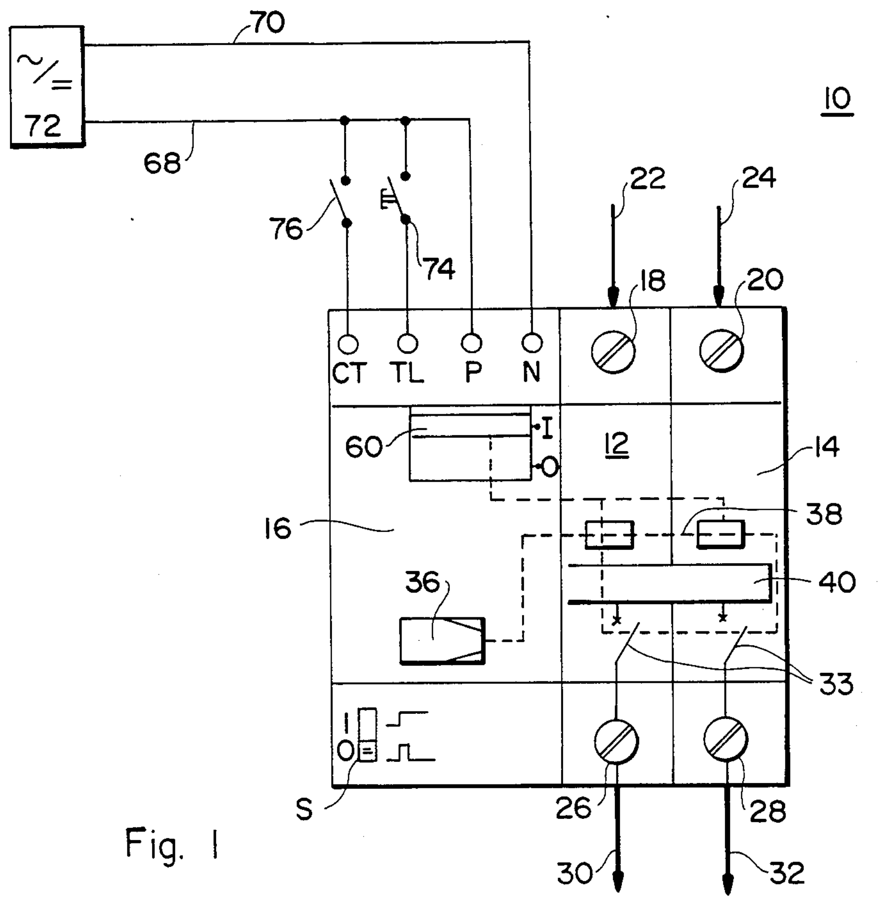
FIG. 1 is a schematic elevation of the breaking device formed by the juxtaposed breaking and remote control units.
Figure 2:
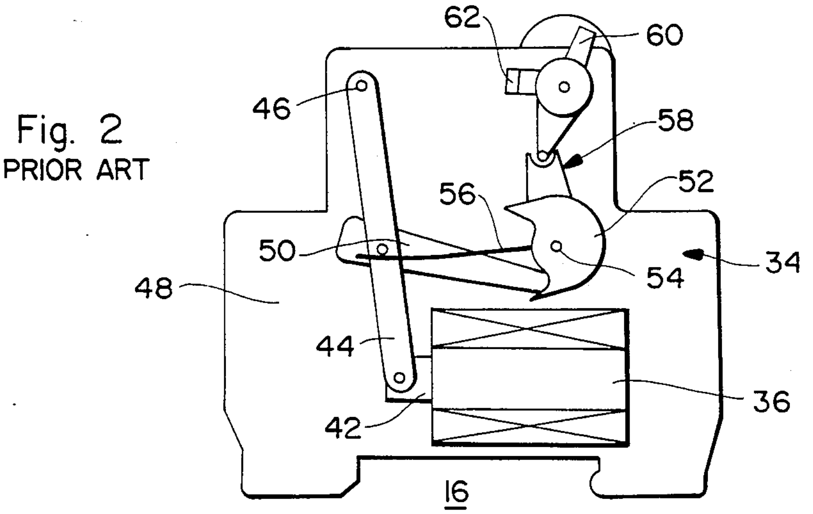
Fig. 2 PRIOR ART
FIG. 2 is a schematic view of the mechanism associated with the remote control unit.

In FIGS. 1 and 2, a remote controlled current breaking device, represented by the general reference 10 comprises two single-pole breaking units 12, 14 or poles, adjoining a remote control unit 16 to constitute a modular two-pole remote control system. Each pole 12, 14 is housed in an individual casing made of moulded insulating material, and contains a breaking mechanism of the type described in detail in French Patent application No. 2,535,520 filed by the applicant. The two poles 12, 14 constitute the power circuit and are fitted with two incoming terminals 18, 20 connected to the low voltage distribution system by two power supply lines 22, 24, and two feeder terminals 26, 28 connected to a load (not represented) by two connecting conductors 30, 32. The poles 12, 14 may of course be housed in a single two-pole casing. Three or four identical poles may also be juxtaposed to form a three or four-pole breaking device.

Each pole 12, 14 comprises a bistable mobile main contact 33 actuated between the two closing and opening positions of the device. The remote control unit 16 is equipped with a remote control mechanism 34 (FIG. 2) designed to provide switching of the mobile contact 33 from the closed position to the open position, and vice-versa, as a result of a remote control order applied to an electromagnetic actuator 36. Inside each breaking pole 12, 14 a thermomagnetic trip device is fitted associated with an automatic tripping mechanism 38 cooperating with the mobile contact 33 to move it to the open position in the event of an overload and/or fault, and to hold it in this position independently from the position of the remote control mechanism 16 so long as the tripping mechanism 38 is in the tripped position. A manual reset toggle 40 of the tripping mechanism 38 has to be actuated to authorize, with the latter in the set position, a remote controlled closing of the device by the remote control unit 16.

The electromagnet 36 of the remote control unit 16 is fitted with a plunger core 42 acting on a swivelling lever 44 articulated at its opposite end on a fixed point 46 of the insulating casing 48. The lever 44 bears a push-rod 50 cooperating mechanically with a rocker 52 mounted with limited rotation on a fixed spindle 54, and with a return spring 56 in the form of a blade. The rocker 52 is coupled by a connecting rod 58 to a pivoting toggle 60 constituting an emergency operating device designed to open or close the breaking device 10 manually. The manual operating toggle 60 is also linked to an arm 62 which can slot into a rocker arm (not shown) acting on the mobile contacts 33 of the poles 12, 14, in such a way as to mechanically secure the rocker arm and the rocker 52.

A brief reminder of operation of the breaking device according to the above-mentioned patent No. 2,535,520 is given hereafter:

In the set position of the reset toggle 40, opening and closing of the contacts of the poles 12, 14 can be either manually controlled by the emergency toggle 60, or remote controlled by energizing the electromagnet 36 of the remote control unit 16. Each time a remote control order is applied to the electromagnet 36, the rocker 52 changes status, and the tripping mechanism 38 remains inactive when these remote control operations take place.

If a fault occurs, the tripping mechanism 38 causes the contacts of the poles 12, 14 to open and the reset toggle 40 to move to the tripped position. The mobile contacts 33 are held in the open position independently from any remote control order. It can be noted that this tripped position of the toggle 40 provides a reliable indication of opening of the contacts. The toggle 40 has to be reset manually to the set position for the breaking device 10 to be reset and ready for further operations controlled by the remote control mechanism 34.

Figure 3:
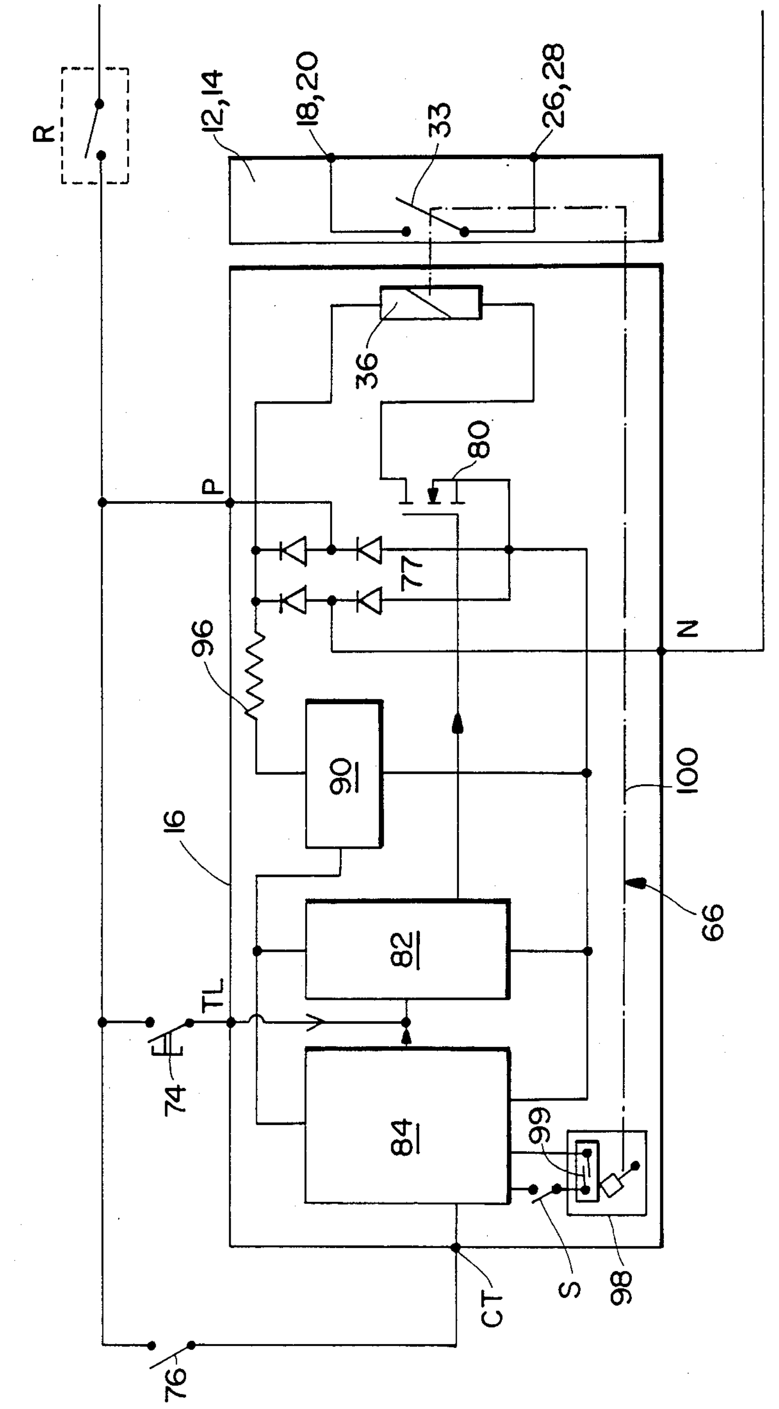
FIG. 3 represents the mimic diagram of the electronic circuit according to the invention.

The remote control unit 16 comprises four connection terminals CT, TL, P and N internally linked with an electronic circuit 66 controlling the electromagnet 36 (FIGS. 1 and 3). The two terminals P and N are the power supply terminals connected by external conductors 68, 70 to an alternating or direct voltage source, for example 220 Volts. The input terminal TL is assigned to a first control by pulses of the impulse relay type, the pulse signal being generated by actuation of a first switch or non-latching contact, notably a push-button 74, interconnected between the terminal TL and the conductor 68. The input terminal CT is used for a second mixed control, which depends on the status of a setting selector S the function of which will be described in detail further on. A second control contact 76 or switch is electrically connected between the terminal CT and the conductor 68. It can be noted that the two input terminals CT and TL are connected by their respective contacts 76, 74 to the same potential, which is that of the power supply terminal P, or according to an alternative embodiment, that of the other power supply terminal N. In the case of a 220 Volt distribution system, the conductors 68, 70 could be connected directly to the power supply lines 22, 24 of the poles 12, 14, enabling the voltage source 72 to be discarded.

Figure 4:
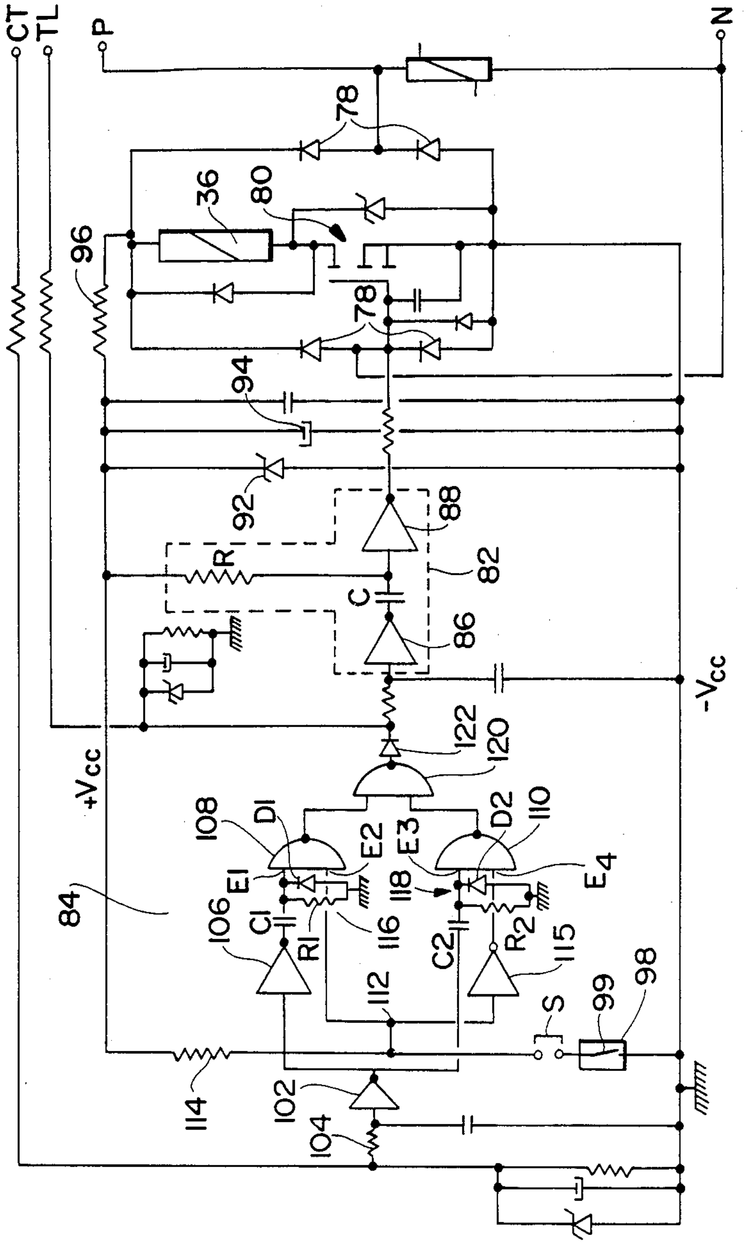
FIG. 4 shows the detailed diagram of the circuit according to FIG. 3.

The electronic circuit 66 in FIGS. 3 and 4 is fitted with a rectifier bridge 77 with diodes 78 comprising an alternating current input, connected to the power supply terminals P and N of the remote control unit 16, and a double alternation rectified current output, connected to the coil of the electromagnet 36 by means of a static switch 80, notably a MOS.FET power transistor, which can be in a conducting status or in a blocked status. The electronic circuit 66 comprises a time delay relay formed by a monostable element 82 whose output controls the transistor 80 and whose input is controlled by a sequential logic circuit 84. The monostable element 82 can be constituted by a 4093 integrated circuit with two changeovers 86, 88 associated with a time delay circuit RC. The monostable element 82 and the logic circuit 84 are supplied by a direct voltage Vcc delivered by a power supply unit 90 comprising a Zener diode 92 mounted in parallel on a filter cell with a capacitor 94 and resistor 96, the assembly being connected to the output terminals of the rectifier bridge 77.

The signal applied to the input terminal TL directly controls the monostable element 82 to form the first pulse control of the impulse relay type.

The status of the output of the sequential logic circuit 84 depends on:

the control signal applied to the input terminal CT,
the position of the setting selector S,
the status of a detector 98 of the position of the mobile main contacts 33 of the poles 12, 14.

The detector 98 may be formed by a REED relay whose control contact 99 is actuated by a permanent magnet fixedly attached to a member 100 (dashed line in FIG. 3) transmitting movement of the mobile main contacts 33, as described in French Pat. No. 2,536,904. The contact 99 of the detector 98 is either open or closed when the main contacts 33 are respectively in the opening or closing position.

The logic circuit 84 comprises an input changeover 102 connected to the terminal CT by a resistor 104. The output of the changeover 102 is connected simultaneously to a changeover 106 which controls one of the inputs E1 of a first logic NAND gate 108, and to one of the inputs E3 of a second logic NAND gate 110. The selector S comprises a contact stud in series with the contact 99 controlling the detector 98 between the ground and a midpoint 112, the latter being connected to the positive pole of the power supply voltage Vcc by a resistor 114. The mid-point 112 is connected on the one hand to the other input E2 of the first NAND gate 108 and on the other hand to a changeover 115 connected to the other input E4 of the second NAND gate 110.

Two derivative circuits 116, 118 derive the control pulse applied to the input terminal CT to obtain a control pulse on the inputs E1, E3 of the NAND gates 108 and 110. The first derivative circuit 116 comprises a capacitor C1 connected between the output of the changeover 106 and the input E1 of the gate 108, and a diode D1 and resistor R1 assembly connected in parallel between the input E1 and the ground. The second derivative circuit 118 comprises a capacitor C2 connected between the output of the changeover 102 and the input E3 of the gate 110, and a diode D2 and resistor R2 assembly connected in parallel between the input E3 and the ground. The anode of each diode D1 and D2 is at the ground potential. The outputs of the two NAND gates 108, 110 control another logic NAND gate 120 connected to the input of the monostable element 82 by a diode 122. The two derivative circuits 116, 118 could of course be replaced by other time delay or shaping circuits.

The second control associated with the input terminal CT depends on the status of the setting selector S constituted by a draw-in stud.

In the active position of the selector S, corresponding to fitting of the stud (S=1), the detector 98 is electrically connected to the mid-point 112, and the input terminal CT constitutes a logic input to which a hold signal, for example of pulse type, can be applied. The logic circuit 84 is sensitive to this signal, and to the logic status of the detector 98. This results in a contactor type control with a function of coherence with the position of the main contacts of the poles 12, 14.

In the inactive position of the selector S, corresponding to removal of the stud (S=0), the action of the detector 98 is neutralized due to the circuit between the detector 98 and the mid-point 112 being broken. The input terminal CT can constitute a second pulse control input, decoupled from the input terminal TL associated with the first pulse control. This results in the possibility of achieving, via the auxiliary contact unit CAOF (not shown in FIG. 1) of the device 10, master impulse relay type controls, which do not require any additional components, such as diode systems or decoupling relays.

The two input terminals TL and CT are accessible simultaneously authorizing coexistence between the first control by pulses, and the second control assignable according to the status of the selector S. A priority code is provided between these two types of control: the control which has received the most recent order has priority. The control orders applied to the terminals TL and CT correspond to fronts, which results in the last front validated imposing its status on the electromagnet 36.

Figure 5:
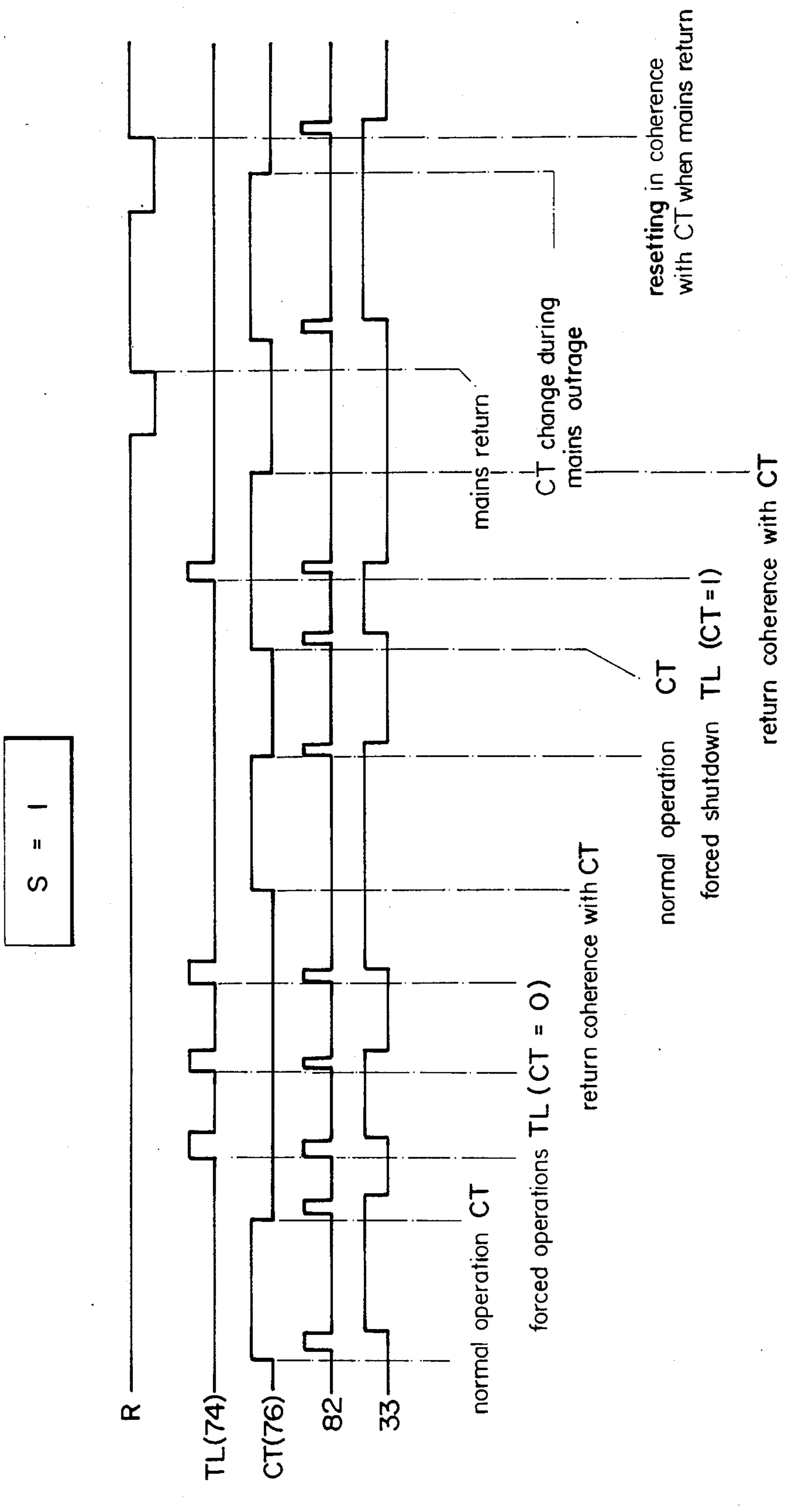
FIGS. 5 and 6 represent the chronograms of the electronic circuit in FIG. 3, respectively in the active position (S=1), and in the inactive position (S=0) of the setting selector.
Figure 6:
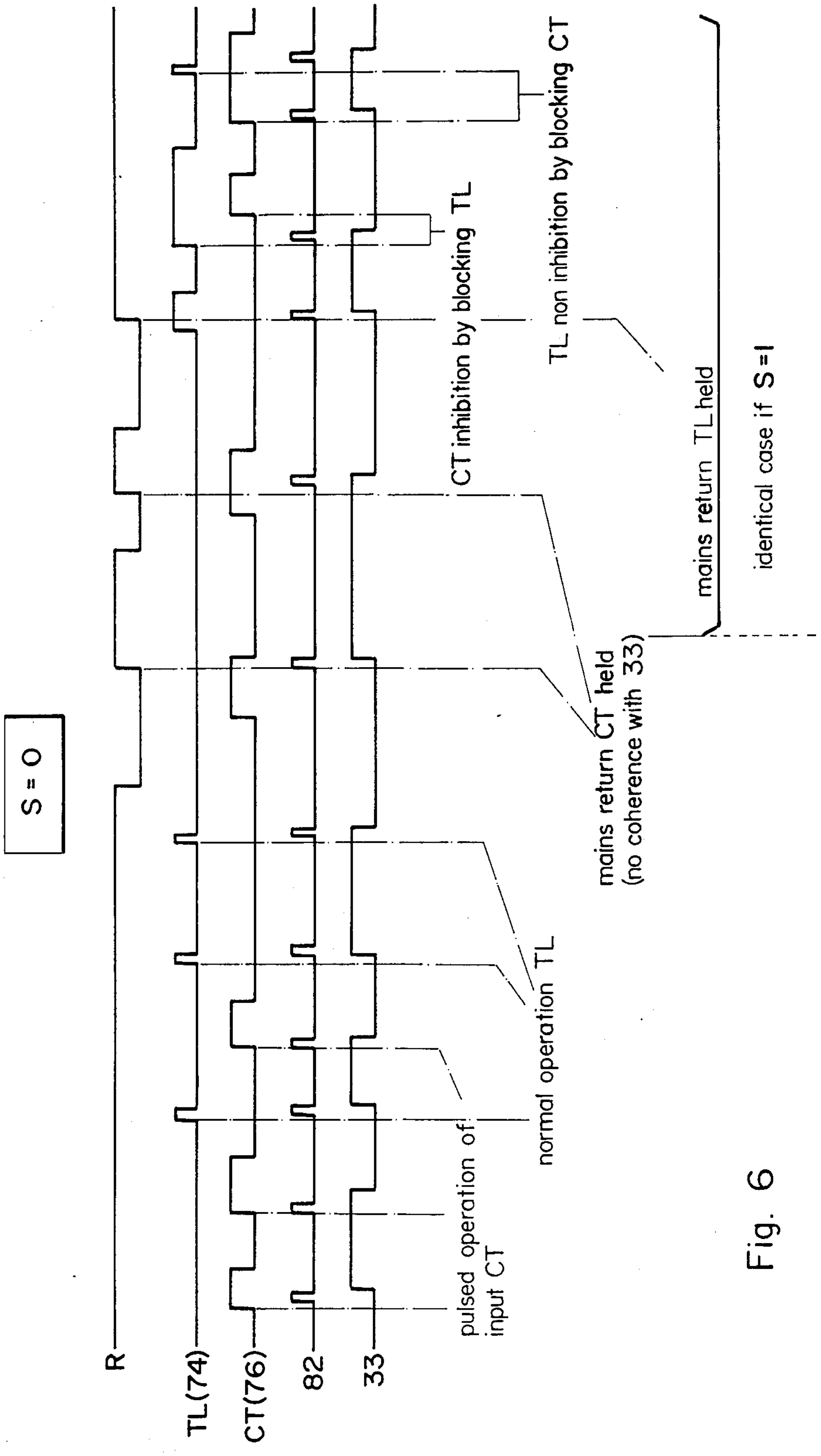

A status refresh function is generated when the power supply circuit to the electronics is interrupted which may occur due to a voluntary intervention or to an accidental mains outage. The contact R (FIG. 3) inserted between the terminal P and the voltage source 72, symbolizes this status refresh function. In the inactive position of the selector (S=0), nothing happens when the supply voltage disappears or returns, except if when it returns the input terminal CT or the input terminal TL is in logic status 1. In the latter case, the device changes status. In the active position of the selector (S=1), the device does not change status when the supply voltage is cut. When the power supply returns, the device 10 switches to comply with the logic status of the input terminal CT, if the push-button 74 associated with the input terminal TL is open. Blocking of the push-button 74 in the depressed position would impose a permanent logic status 1 on the terminal TL and would cause a status change of the device 10. The two chronograms in FIGS. 5 and 6 represent in the active (S=1) and inactive (S=0) positions of the selector S the logic statuses at different points of the electronic circuit 66 in FIG. 3, for simultaneous operation of the first and second controls on a supply voltage outage, having previously been present, and return:

contact R (electronics supply voltage)
contact 74 (input terminal TL)
contact 76 (input terminal CT)
output of monostable element 82
main contacts 33 via the detector 98.

Operation of the remote control unit 16 takes place as follows:

In the set position of the reset toggle 40, each remote control order delivered by the monostable element 82 to the static power switch 80 causes excitation of the electromagnet 36 and a status change of the mobile main contacts 33 of the poles 12, 14. This remote control order may either come from the first control by pulses associated with the input terminal TL (closing of the push-button 74) or from the second control assignable according to the status of the selector S, and associated with the input terminal CT (closing of contact 76).

The first control corresponds to operation of the device 10 in impulse relay mode, each pulse applied to the input terminal TL causing a status change of the main contacts 33.

The second control corresponds to a contactor mode of the device 10 when the contact stud of the selector S is in the drawn-in position (S=1). The contact 76 may be actuated by a clock, timer or automatic control device (not shown), in such a way as to apply control pulses to the input terminal CT, each pulse having a width generally greater than that of the pulses of the first control (see FIG. 5). The control order at the output of the NAND circuit 120 depends on the status of the contact 76 generating the pulse at the input terminal CT, and on the status of the detector 98 representing the position of the mobile main contacts 33. The output of the NAND circuit 120 switching to logic status 1 corresponding to a position change order of the contacts 33 requires the contact 76 and the detector 98 to be at different logic levels from one another, i.e. the main contacts 33 to be open when the control contact 76 closes, or the main contacts 33 to be closed when the contact 76 opens. In the former case, closing of the contact 76 generates a rising front of the pulse which results in closing of the main contacts 33. In the latter case, opening of the contact 76 generates a descending front of the pulse which commands opening of the main contacts 33. Closing of the contact 76 in the closed position of the main contacts 33, and opening of the contact 76 in the open position of the main contacts 33 do not bring about any status change of the device 10. This operating mode is identical to the one described in French Pat. No. 2,536,904.

Figure 7A:
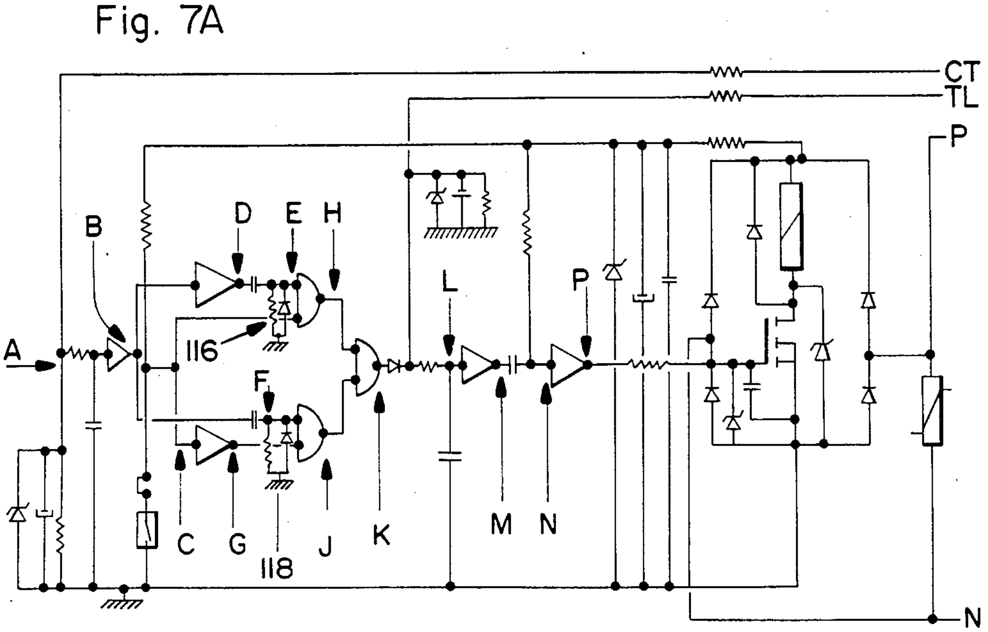
Figure 7B:
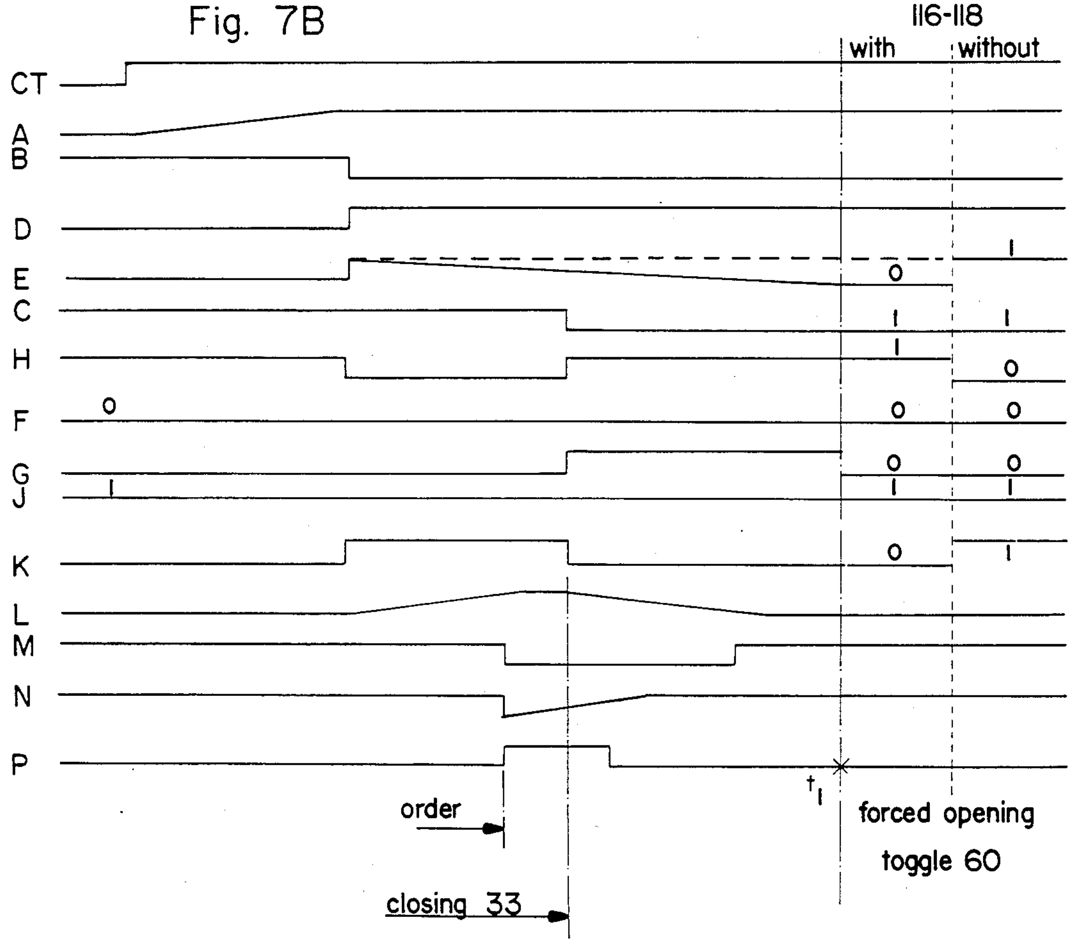

FIGS. 7*a*, 7*b*, 8*a* and 8*b* show, in the active position of the selector S, a detailed phase of a chronogram in contactor mode showing the signals A to P at different points of the electronic circuit 66 in FIG. 4, respectively on a remote closing and opening order of the main contacts 33. No pulse is applied during this phase to the input terminal TL. The basic role of the derivative circuit 116 can be noted, which is to branch the control order CT, in such a way as to apply a pulse E to the input E1 of the NAND gate 108 instead of the permanent logic status 1 of the signal D on a remote closing order (FIG. 7*a*). The same is true of the second derivative circuit 118 which applies a pulse F to the input E3 of the NAND gate 110 instead of the permanent logic status 1 of the signal B on a remote opening order (FIG. 8*a*). The presence of the derivative circuits 116, 118 creates a dissymmetry between the control signal CT and the signal C from the detector 98, which only serves the purpose of validating or invalidating the control signal CT. This dissymmetry does not play any part during the normal remote closing or opening control phases, but is indispensable in the event of a manual closing or opening operation by means of the toggle 60 causing forced operation of the device 10. This property is illustrated in the right-hand part of FIGS. 7*b* and 8*b*. In FIG. 7*b*, a manual opening by means of the toggle 60 taking place after a remote closing order of the contacts 33 is simulated beyond the moment t1. This forced manual opening causes a status change of the detector 98 leading to switching of signals C and G. In the presence of the first derivative circuit 116, the output signal K of the NAND gate 120 is in logic status 0, which means that the device 10 accepts the forced operation. The absence of the first derivative circuit 116 would mean a permanent logic status 1 of the signal E, which would induce a counter-order (logic status 1 of the signal K) leading to remote-controlled reclosing of the contacts 33 by the electromagnet 36.

In FIG. 8*b*, a manual closing by means of the toggle 60 taking place after a remote opening order of the contacts 33 is simulated beyond the moment t2. This results in a status change of the signals C and G (switching of the detector 98), but the output signal K of the NAND gate 120 remains in logic status 0 due to the presence of the second derivative circuit 118 which authorizes this forced operation. The absence of the circuit 118 would result in a counter-order being emitted (signal K in logic status 1) to the electromagnet 36 and remote reopening of the contacts 33.

Removing the contact stud of the selector S neutralizes the action of the position detector 98 of the contacts 33, and prevents operation of the second control in contactor mode. The input terminal CT nevertheless remains accessible to form a control input by pulses, decoupled from the first control associated with the input terminal TL.

The input terminals CT and TL of the electronic control circuit 66 are practically insensitive to capacitive currents which may occur on a connecting cable of great length connecting the contacts 76, 74 to the corresponding terminals CT, TL. The voltage VN between the power supply terminal N and the ground of the electronic circuit 66 is constituted by a periodic positive alternation signal determined by a diode 78 of the rectifier bridge 77. The leakage capacity of the connecting cable charges itself positively to a value appreciably equal to the mean voltage of VN. In the absence of control signals applied to the terminals CT, TL, the voltage at the input of the changeover 102 of the logic circuit 82 is close to zero. This results in the terminals CT and TL being subjected to a very high attenuation to the currents generated by the interference capacity of the cable (attenuation greater than a factor 10).

We claim:

1. A multipole breaking device with electric remote control, comprising:
   - a breaking device per pole equipped with a bistable mobile main contact moveable between a closed and an opened position,
   - a trip release for moving the mobile main contact to the opened position in the event of a fault occurring,
   - a first mechanism for automatically tripping said trip release,
   - a first manual device for resetting the first mechanism,
   - a second mechanism, mechanically linked with the mobile main contact of each pole, for manually opening and closing the mobile main contact,
   - a remote control unit comprising an electromagnetic actuator, including an electromagnet, associated with the second mechanism,
   - a second manual device, coupled to the second mechanism to enable manual opening and closing of said mobile main contact,
   - an electronic circuit, including a static switch connected in a power supply circuit of the electromagnet, for controlling excitation of the electromagnet in such a way as to bring about in the set position of the first mechanism a status change of the bistable mobile contact on each control pulse applied to the static switch,
   - a mobile main contact position detector,
   - a selector having an active and an inactive status for switching the position detector into or out of the electronic circuit,
   - a first input terminal assigned to a first electrical pulse control of the electronic circuit,
   - a second input terminal associated with a second mixed control of said electronic circuit, said second control being designed for a logic control by a hold signal when said position detector is in the electronic circuit, and for a second pulse control, independent of said first pulse control, when said position detector is out of the electronic circuit.

2. A breaking device according to claim 1, wherein the electronic circuit controlling the electromagnet comprises a sequential logic circuit sensitive to the status of the control signal applied to the second input terminal, and to the status of the detector in the active position of the selector, and further comprising time delay or shaping means for modifying the internal status of the logic circuit by making the detector signal passive following a forced openig or closing operation by the second manual device.

3. A breaking device according to claim 2, wherein the remote control unit further comprises, two power supply terminals connected to an alternating or direct voltage source by conductors, and wherein the first input terminal and the second input terminal are connected externally to the same potential by means of control contacts.

4. A breaking device according to claim 2, wherein the sequential logic circuit time delay means are formed by a derivative device designed to derive the control signal applied to the second input terminal.

5. A breaking device according to claim 4, wherein the sequential logic circuit comprises:

an input changeover internally connected with the second input terminal, a first logic NAND gate having an input connected to the output of the input changeover by means of an auxiliary changeover, and another input connected to the detector in the active position of the selector, a second logic NAND gate having an input connected to the output of the input changeover, and an output connected to the selector by means of an auxiliary changeover, a third logic NAND gate having inputs connected to the respective outputs of the first and second logic gates, said derivative device comprising a first derivative circuit connected between the auxiliary changeover and the input of the first logic NAND gate, and a second derivative circuit inserted between the input changeover and the input of the second logic NAND gate.

6. A breaking device according to claim 5, wherein the electronic circuit further comprises, a monostable element having an output connected to the control electrode of a static switch, and an input simultaneously controlled by the control pulse applied to the first input terminal, and by the status of the output of the third logic NAND gate of the sequential logic circuit.

7. A breaking device according to claim 5, wherein said first and second derivative circuit each comprise a capacitor connected in series in the circuit linking the input changeover with the corresponding input of the first and second gates, and a resistor and diode assembly, connected in parallel between said input and the ground.

8. A breaking device according to claim 3, wherein the first input terminal and the second input terminal of the electronic circuit are arranged in such a way as to be insensitive to the capacitive currents generated by an interference capacity of a connecting cable of great length connecting respectively the contacts to the corresponding terminals.

* * * * *